(12) United States Patent
Takahashi et al.

(10) Patent No.: US 6,298,018 B1
(45) Date of Patent: Oct. 2, 2001

(54) OPTICAL RECORDING AND REPRODUCING METHOD OPTICAL RECORDING AND REPRODUCING DEVICE, AND OPTICAL RECORDING MEDIUM

(75) Inventors: Akira Takahashi, Nara; Yoshiteru Murakami, Nishinomiya; Naoyasu Iketani; Ippei Suzuki, both of Tenri; Go Mori; Shinya Hirata, both of Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/264,416

(22) Filed: Mar. 8, 1999

(30) Foreign Application Priority Data

Mar. 9, 1998 (JP) .................................................. 10-056553

(51) Int. Cl.$^7$ ....................................................... G11B 7/12
(52) U.S. Cl. ................................... 369/44.23; 369/112.23
(58) Field of Search ........................... 369/44.23, 44.25, 369/44.14, 44.12, 44.28, 44.37, 112, 110, 109, 54, 112.01, 112.23, 112.24

(56) References Cited

U.S. PATENT DOCUMENTS

| | | | |
|---|---|---|---|
| 5,004,307 | 4/1991 | Kino et al. | 350/1.2 |
| 5,125,750 | 6/1992 | Corle et al. | 359/819 |
| 5,470,627 | 11/1995 | Lee et al. | 428/64.4 |
| 6,069,853 | * 5/2000 | Novotny et al. | 369/13 |

* cited by examiner

Primary Examiner—Muhammad Edun
(74) Attorney, Agent, or Firm—Dike Bronstein, Roberts & Cushman IP Group; David G. Conlin; David A. Tucker

(57) ABSTRACT

An optical disk is provided with a recording layer, and with an optical coupling layer on a light-incident side of the recording layer. An optical recording and reproducing device and method include an objective lens and a hemispherical lens, which converge a light beam from a light source and project the light beam onto the optical disk. The hemispherical lens is provided in close proximity to the optical coupling layer, in a position such that an interval therebetween is not more than the wavelength of the light produced by the light source. The light beam converged by the objective lens and the hemispherical lens is coupled with the optical coupling layer while substantially maintaining a direction of propagation in which it was propagating while inside the hemispherical lens.

25 Claims, 7 Drawing Sheets

OPTICAL RECORDING AND REPRODUCING METHOD OPTICAL RECORDING AND REPRODUCING DEVICE, AND OPTICAL RECORDING MEDIUM

FIELD OF THE INVENTION

The present invention relates to an optical recording and reproducing method for converging light from a light source onto a signal recording layer of an optical recording medium such as an optical disk, and relates to an optical recording and reproducing device and an optical recording medium.

BACKGROUND OF THE INVENTION

Optical disks, magneto-optical disks, etc. are used in memory devices for computers, and as packaged media for music and video information. In optical recording and reproducing devices for this type of disk, a light beam projected by a light source is converged by an objective lens, and projected onto a recording layer of the disk, where recording and reproducing are performed (this type of optical recording and reproducing device will hereinafter be referred to as "Conventional Example 1").

In recent years, there is a demand for increased recording density in such optical recording and reproducing devices. One method of achieving increased recording density is to reduce the diameter of the light spot projected onto the recording layer of the optical recording medium.

The reason behind this is that, when reproducing an information signal from an optical recording medium recording small recording marks at high density, a smaller light spot diameter gives rise to less contamination of the signal by signals from marks adjacent to a mark to be reproduced (so-called "crosstalk"), and the small recording marks can thus be reproduced accurately. Further, in recording an information signal in the recording medium, a smaller light spot diameter enables small marks to be recorded accurately, without influencing adjacent marks.

However, the spot diameter of a light beam is proportional to $\lambda/NA$, where $\lambda$ is the wavelength of the light and NA is the numerical aperture. Therefore, in order to reduce the diameter of a light beam spot, it suffices to increase the numerical aperture of the objective lens which converges the light beam onto the surface of the recording medium. However, due to the difficulty of manufacturing objective lenses, there is a limit to how much the numerical aperture can be increased (practically, to around 0.6).

One proposed solution to this difficulty is to decrease the spot diameter by using a composite of lenses for the objective lens (hereinafter referred to as an "objective lens composite"). The following will explain such an objective lens composite in concrete terms with reference to FIG. 5.

As shown in FIG. 5, this type of objective lens composite includes an objective lens 200 having a numerical aperture of NA, and a hemispherical lens 201 having a refractive index of N. A parallel light beam P1 is projected onto the objective lens 200, which reduces the beam diameter thereof and projects a converged light beam P2. The hemispherical lens 201 has a hemispherical light-incident surface facing the objective lens 200, and is positioned such that rays of the light beam P2 strike the foregoing light-incident surface perpendicularly. Further, the opposite surface of the hemispherical lens 201 from the light-incident surface is flat.

In an objective lens composite with the foregoing structure, since the rays of the light beam P2 exiting the objective lens 200 strike the light-incident surface perpendicularly, there is little reflection or diffraction of these rays as they enter the hemispherical lens 201. Accordingly, as the light beam P2 enters the hemispherical lens 201, it maintains the angle with which it was converged by the objective lens 200 of numerical aperture NA. Here, since the hemispherical lens 201 has a refractive index of N, the wavelength of the light after entering the hemispherical lens 201 is 1/N.

Then, light exiting the flat surface of the hemispherical lens 201 is further converged due to a difference in refractive indices of the hemispherical lens 201 and air, exiting as a light beam P3 corresponding to a numerical aperture of N×NA (wavelength returns to $\lambda$).

In this way, with an objective lens composite like that shown in FIG. 5, a light beam effectively having a large numerical aperture can be easily produced. Various optical disk devices using this type of objective lens composite have been proposed.

An optical disk device using such an objective lens composite, shown in FIG. 6, is disclosed in Japanese Unexamined Patent Publication Nos. 8-221772/1996 (Tokukaihei 8-221772) and 8-221790 (Tokukaihei 8-221790) (the optical disk device disclosed in these publications will be referred to hereinafter as "Conventional Example 2").

In the foregoing conventional optical disk device, light projected from an objective lens composite 210, made up of an objective lens 200 and a hemispherical lens 201, reaches an optical disk 211 across a gap 212 of at least several $\mu$m, and is projected onto a recording layer 213, in which information is recorded. Here, light projected from the objective lens composite 210 crosses the gap 212 and reaches the optical disk 211 as a light beam corresponding to a numerical aperture of N×NA, as discussed above.

With the foregoing conventional optical disk device, the light beam projected onto the optical disk 211 has a numerical aperture N times greater (N=refractive index of the hemispherical lens 201), i.e., a beam spot with a diameter of 1/N times that when the objective lens 200 is used alone.

Another optical disk device using an objective lens composite, shown in FIG. 7, is disclosed in *Nikkei Electronics*, Jun. 16, 1997, pp. 99–108 (hereinafter referred to as "Conventional Example 3").

In the foregoing conventional optical disk device, an objective lens composite 210, made up of an objective lens 200 (numerical aperture=NA) and a hemispherical lens 201 (refractive index=N), is positioned in close proximity (around $\lambda/4$) to a recording layer 213 of an optical disk 211.

If the objective lens composite 210 and the recording layer 213 are positioned in close proximity with one another, near field effect causes light attempting to exit the flat surface of the hemispherical lens 201 to seep through the flat surface and reach the recording layer retaining the same properties it had inside the hemispherical lens 201.

As mentioned above, while inside the hemispherical lens 201, the light beam has a numerical aperture of NA and a wavelength of 1/N of its initial wavelength. Accordingly, the light beam which reaches the recording layer 213 has a wavelength of 1/N times that of normal projected light. Therefore, the light beam projected onto the recording layer 213 has a beam spot of 1/N the diameter of normal projected light.

In this way, Conventional Example 3 makes use of near field effect to guide the light beam, whose wavelength has been reduced by the hemispherical lens 201, to the recording layer 213 with unchanged properties, thus reducing the size of the beam spot. An example of use of such an objective lens composite in a lithography system is disclosed in U.S. Pat. No. 5,121,256.

As discussed above, with Conventional Examples 2 and 3, the size of the beam spot projected onto the recording layer can theoretically be reduced, thus realizing high density of information recording in the optical disk.

However, in the case of Conventional Example 2 shown in FIG. 6, if the numerical aperture of the light beam projected from the objective lens composite 210 is too large, rays near the perimeter of the light beam exiting the hemispherical lens 201 have a large angle of incidence at the flat surface of the hemispherical lens 201, and are totally reflected therefrom. Thus there is a limit to how much the numerical aperture can be increased.

For example, reflectance at the interface between the hemispherical lens 201 (refractive index=1.5) and air (refractive index=1.0) begins to increase at an angle of incidence of around 33°, and is totally reflected at an angle of incidence of 41.8°.

An increase in reflectance means that less light reaches the optical disk 211, and with total reflection, no light is projected onto the optical disk 211. For this reason, with Conventional Example 2, there is a limit to how much the numerical aperture can be increased to improve recording density. Practically, the numerical aperture cannot be increased to more than about 0.85.

Further, with Conventional Example 3 shown in FIG. 7, in order for the light, whose wavelength is reduced to 1/N of its wavelength in air, to be guided to the recording layer while maintaining that wavelength, it is necessary to position the recording layer 213 and the hemispherical lens 201 so that a distance therebetween is around ¼ of the initial wavelength of the light, and in this case, the optical disk 211 as a recording medium cannot be provided with an effective protective film. Therefore, operations are greatly influenced by dust, and even dust on the order of the wavelength of the light not only influences operations, but may also damage the optical disk. Further, if the optical disk 211 as a recording medium is made air-tight to avoid dust, one characteristic advantage of optical disks, namely, substitution of different disks, is lost.

A further problem with the optical disk device in Conventional Example 3 is that, since the efficiency of optical coupling between the hemispherical lens 201 and the recording layer 213 is reduced to approximately 50%, a sufficient quantity of information light cannot be obtained. The reason for this, the present inventors believe, is that in Comparative Example 3, the light beam whose wavelength has been reduced (to 1/N of its initial wavelength) in the hemispherical lens 201 exits into air through the flat surface.

At this time, the light beam diameter (the diameter of that part of the light beam where light quantity is $1/e^2$ of peak intensity) is smaller than the wavelength in air. Accordingly, since the light beam has a diameter which cannot usually exist in air, if the interval between the hemispherical lens 201 and the recording layer is too large, the light apparently undergoes some sort of loss after exiting into the air.

SUMMARY OF THE INVENTION

The present invention resolves the foregoing problems, and it is an object hereof to provide an optical recording and reproducing method and an optical recording and reproducing device and optical recording medium which are able to efficiently project a light beam having a small beam spot diameter onto a recording layer of an optical recording medium such as an optical disk.

*c1 An optical recording and reproducing method according to the present invention is a method for performing at least one of recording information in and reproducing information from an optical recording medium by projecting a light beam from a light source onto a signal recording layer of the optical recording medium, in which: the optical recording medium is provided with an optical coupling layer on a light-incident side of the signal recording layer; an objective lens structure having a light-converging function is provided in close proximity to the optical recording medium, in a position such that an interval between the objective lens structure and the optical recording medium is less than the wavelength of light produced by the light source; and the light beam is projected onto the signal recording layer of the optical recording medium by causing the light beam converged by the objective lens structure to couple with the optical coupling layer of the optical recording medium.

With the foregoing method, by providing the objective lens structure in close proximity to the optical recording medium, in a position such that an interval between the objective lens structure and the optical recording medium is less than the wavelength of the light produced by the light source, reflection from the optical coupling layer can be held to a minimum, and thus light from the objective lens structure can be efficiently guided to the optical coupling layer and converged onto the signal recording layer.

Consequently, the foregoing method can hold to a minimum damage to the signal recording layer due to contact with the objective lens structure, and loss of light projected from the objective lens structure, to which conventional methods were prone. Accordingly, with the foregoing method, recording and reproducing of information recorded at high density on the signal recording layer can be performed stably and with certainty.

*c2 Another optical recording and reproducing method according to the present invention is a method for at least one of recording information in and reproducing information from an optical recording medium provided with a signal recording layer and with an optical coupling layer on a light-incident side of the signal recording layer, by projecting a light beam from a light source onto the optical recording medium, in which: an objective lens structure is provided, which converges light from the light source onto the optical recording medium; and the light beam is projected onto the signal recording layer of the optical recording medium by using the objective lens structure to guide the light beam into the optical coupling layer in such a manner as to substantially maintain a direction of propagation of light exiting a light-exit end of the objective lens structure.

With the foregoing method, by guiding the light beam into the optical coupling layer in such a manner as to substantially maintain a direction of propagation of light exiting a light-exit end of the objective lens structure, the light beam is transmitted through the optical coupling layer. Consequently, with the foregoing method, the light beam can be stably converged onto the signal recording layer while holding light loss to a minimum. Accordingly, with the foregoing method, recording and reproducing of information recorded at high density on the signal recording layer can be performed stably and with certainty.

In the foregoing optical recording and reproducing method, further, the diameter of the light beam projected from the objective lens structure is, at the end of the light beam incident on the optical coupling layer, preferably greater than the wavelength of the light from the light source. with the foregoing structure, since the diameter of the light beam can be set to greater than the wavelength of the light from the light source, the optical coupling ratio can be increased. Therefore, with the foregoing method, light can be stably converged while holding light loss to a minimum, and thus recording and reproducing of information recorded at high density on the signal recording layer can be performed stably and with certainty.

*c4 An optical recording and reproducing device according to the present invention comprises a light source and an objective lens structure which converges a light beam from the light source onto an optical recording medium, and performs at least one of recording information in and reproducing information from the optical recording medium by projecting the light beam from the light source thereon; in which the optical recording medium is provided with a signal recording layer, and with an optical coupling layer on a light-incident side of the signal recording layer; and the objective lens structure is provided in close proximity to the optical recording medium, in a position such that an interval between the objective lens structure and the optical recording medium is less than the wavelength of light produced by the light source, and the light beam converged by the objective lens structure is caused to couple with the optical coupling layer.

With the foregoing structure, by providing the objective lens structure in close proximity to the optical recording medium, in a position such that an interval between the objective lens structure and the optical recording medium is less than the wavelength of the light produced by the light source, light from the objective lens structure can be efficiently guided to the optical coupling layer and converged onto the signal recording layer. Consequently, the foregoing structure can hold to a minimum damage to the signal recording layer due to contact with the objective lens structure, and loss of light projected from the objective lens structure, to which conventional structures were prone. Accordingly, with the foregoing structure, recording and reproducing of information recorded at high density on the signal recording layer can be performed stably and with certainty.

In the foregoing optical recording and reproducing device, further, the refractive index of the portion of the objective lens structure closest to the optical coupling layer is preferably set approximately equal to the refractive index of the optical coupling layer. With the foregoing structure, by setting the refractive index of the portion of the objective lens structure closest to the optical coupling layer approximately equal to the refractive index of the optical coupling layer, the optical coupling ratio can be increased. Accordingly, with the foregoing structure, sufficient light quantity can be projected onto the signal recording layer, and thus recording and reproducing of information recorded at high density on the signal recording layer can be performed stably and with certainty.

*c12 An optical recording medium according to the present invention undergoes at least one of recording and reproducing of information when an objective lens structure, which converges a light beam from a light source, is positioned such that an interval between the optical recording medium and the objective lens structure is less than the wavelength of the light from the light source; the optical recording medium including a signal recording layer, on which information is recorded, and an optical coupling layer provided on a side of the signal recording layer facing the objective lens structure, with which light projected from the objective lens structure couples.

With the foregoing structure, by positioning the objective lens structure such that an interval between the objective lens structure and the optical recording medium is less than the wavelength of the light from the light source, light from the objective lens structure can be converged onto the signal recording layer stably and with certainty, even if the objective lens structure has a large numerical aperture. Therefore, with the foregoing structure, it is possible to increase the density of recording of information on and reproducing of information from the signal recording layer.

Further, with the foregoing structure, by providing the optical recording medium with the optical coupling layer, the signal recording layer and the objective lens structure can be distanced from one another, and thus damage to the signal recording layer by the objective lens structure during recording and reproducing of information can be avoided. At the same time, with the foregoing structure, since light projected from the objective lens structure is immediately transmitted into the optical coupling layer, it is projected so as to be stably converged onto the signal recording layer, at a wavelength corresponding to the refractive index of the optical coupling layer. Therefore, with the foregoing structure, it is possible to increase the density of recording of information on and reproducing of information from the signal recording layer more stably and with greater certainty.

In the foregoing optical recording medium, further, the optical coupling layer preferably also serves as a protective film for the signal recording layer. With this structure, since the signal recording layer is protected by the optical coupling layer, recording of information on and reproducing of information from the signal recording layer can be performed more stably.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

The following will explain an optical recording and reproducing device according to one embodiment of the present invention, with reference to the drawings. The present embodiment explains an example of application of the optical recording and reproducing device according to the present invention to an optical disk device (optical disk system) , but in addition to optical disk devices, the optical recording and reproducing device of the present invention is of course also applicable to optical card devices, optical tape devices, etc.

First, the principle of the present embodiment will be explained with reference to FIG. 1.

Figure 1:
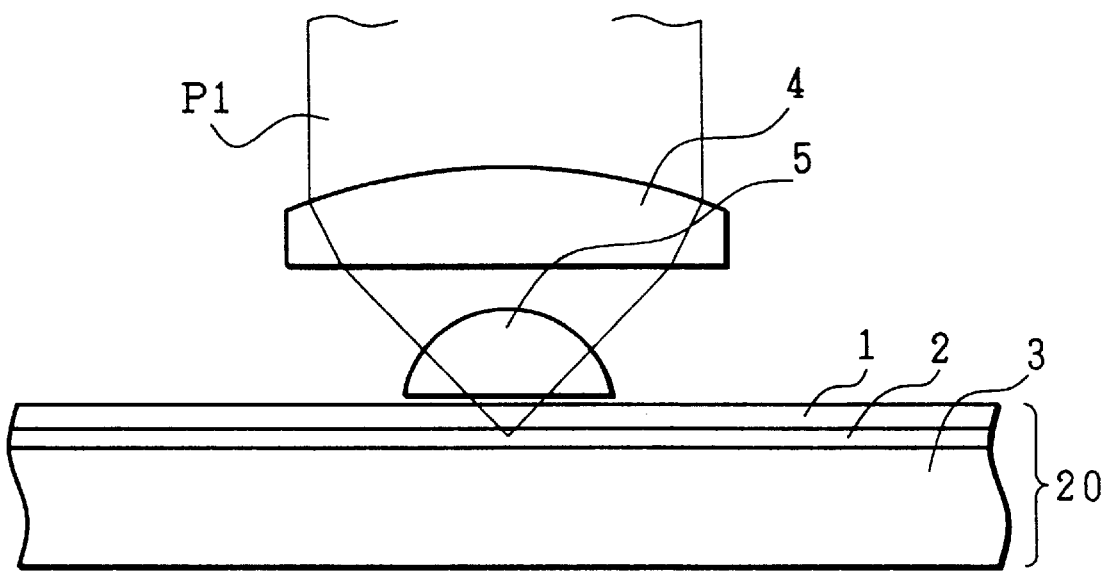
FIG. 1 is an explanatory drawing of an optical disk device according to the present invention.

As shown in FIG. 1, the foregoing optical disk device includes an objective lens 4 (a convex lens) and a hemispherical lens 5 (also a convex lens), which collectively make up the objective lens structure. The objective lens 4 and the hemispherical lens 5 are provided so that their respective central axes coincide with a light axis of a parallel light beam P1 incident on the objective lens 4. Further, the objective lens 4 and the hemispherical lens 5 are provided in that order in the direction of propagation of the light beam P1.

In the hemispherical lens 5, a light-incident surface is hemispherical, and a light-exit surface is flat (perpendicular to the central axis of the hemispherical lens 5). The hemispherical surface is provided so as to form part of a sphere centered on a focal point of light converged by the objective lens 4. In the present embodiment, the numerical aperture of the objective lens 4 is NA, and the refractive index of the hemispherical lens 5 is N1.

The foregoing optical disk device is also provided with an optical disk 20, on which, using the objective lens structure, at least one of recording and reproducing of information is performed. In the optical disk 20, a substrate 3 is provided with a recording layer 2, on which is provided an optical coupling layer 1. The optical coupling layer 1 has light transmittance, and has a refractive index set in consideration of the refractive index of the hemispherical lens 5. The refractive index of the optical coupling layer 1 is preferably approximately equal to that of the hemispherical lens 5.

In the optical disk device structured as above, the light (wavelength=$\lambda$) of the parallel light beam P1 incident on the objective lens 4 is converged thereby, and the rays of this converged light are projected into the hemispherical lens 5 perpendicular to the hemispherical surface thereof. In the hemispherical lens 5, this light becomes a light beam with a numerical aperture of NA and a wavelength of $\lambda/N1$. This light then exits the flat surface of the hemispherical lens 5 into air, and is incident on the optical disk 20.

Here, generally (as in the case of Conventional Example 2 above), if the numerical aperture of the light exiting the hemispherical lens 5 is large, the angle of incidence on the optical disk 20 is large, and light is reflected from the surface of the optical disk 20 and the flat surface of the hemispherical lens 5, resulting in light loss.

However, in the present invention, as discussed above, the light-incident side of the optical disk 20 is provided with the optical coupling layer 1 having a refractive index approximately equal to that of the hemispherical lens 5, and the hemispherical lens 5 is provided such that the flat surface thereof is positioned in close proximity to the optical coupling layer 1 (at a distance smaller than the initial wavelength $\lambda$ of the light).

In this way, by positioning the optical coupling layer 1, which is an optical medium having a refractive index approximately equal to that of the hemispherical lens 5, close to the surface where total reflection is likely to occur, evanescent light at the total reflection surface is transmitted into the nearby optical coupling layer 1.

In other words, the light beam exiting from the flat surface of the hemispherical lens 5 couples with the optical coupling layer 1 due to near field effect, and proceeds in substantially the same direction as its direction of propagation inside the hemispherical lens 5. In this way, the light beam can be guided into the optical coupling layer 1 without causing much reflection when exiting from the hemispherical lens 5 into air.

Here, since the refractive indices of the optical coupling layer 1 and the hemispherical lens 5 are approximately equal, the light beam guided into the optical coupling layer 1 has the same properties it had while inside the hemispherical lens 5. For this reason, the light propagating through the optical coupling layer 1 has a numerical aperture of NA and a wavelength of $\lambda/N1$. This light beam then propagates through the optical coupling layer 1 and is projected onto the recording layer 2. Consequently, a light beam with a wavelength of $\lambda/N1$ and a numerical aperture of NA is incident on the recording layer 2.

In this way, the density at which information can be recorded in the optical disk is increased over an ordinary optical disk. Further, since there is no reflection like that which occurs with Conventional Example 2, sufficient light quantity can be obtained for recording information on and/or reproducing information from the recording layer 2.

As discussed above, the present invention, making use of near field effect and taking advantage of the tendency of light to continue propagating in a given direction, guides the light beam into the optical coupling layer 1 while holding to a minimum reflection when the light beam exits the hemispherical lens 5 into air. Further, the technical thought of the present invention differs from that of conventional structures (like Conventional Example 3) which make use of near field effect to transmit the energy of light converged by a hemispherical lens directly to a recording layer of an optical disk.

For this reason, there is no need to position the recording layer 2 and the hemispherical lens 5 in close proximity, as was necessary with Conventional Example 3, and the light beam in air (after exiting from the flat surface of the hemispherical lens 5) is prevented from becoming a light beam which could not exist under normal conditions.

Moreover, in the present invention, the optical coupling layer 1 also serves to protect the recording layer 2, thus protecting the recording layer 2 from damage caused by the scanning of the hemispherical lens 5, etc. Further, since the diameter of the light beam when exiting from the hemispherical lens 5 can be set to at least a predetermined value, the optical coupling ratio can be increased. Here, it is satisfactory to set the diameter of the light beam when exiting from the hemispherical lens 5 to approximately the wavelength of the light (in air) or more.

The present invention as explained above makes use of near field effect. In order to obtain this effect, the interval between the hemispherical lens 5 and the optical coupling layer 1 should preferably be no more than ¼ of the wavelength of the light (in air), and near field effect can function even more effectively if this interval is no more than ⅛ of the wavelength of the light (in air).

Further, the foregoing explains a lens system capable of realizing a large aperture number, made up of the objective lens 4 and the hemispherical lens 5, but the lens system is not limited to this structure. Alternatively, a single objective lens may be used, provided it has a large numerical aperture.

Again, provided it allows optical read-out of information, the recording layer 2 may be one which records information using extruded or recessed pits, one which records information by means of phase change recording or magneto-optical recording, etc.

Incidentally, as discussed above, the optical disk device explained in the present embodiment performs recording/reproducing of information by projecting light onto the recording layer 2 with a beam spot which is smaller than in the optical disk device of Conventional Example 1, but the recording/reproducing method, servo control method for the beam spot, etc. can be realized using methods equivalent to conventional methods. Accordingly, the present embodiment here omits explanation thereof.

The following will explain a more specific example of the present embodiment.

In FIG. 1, the objective lens 4 has a numerical aperture set to 0.6, and converges light having a wavelength of 400 nm. This converged light is then projected into the hemispherical lens 5, which has a refractive index of 1.6. The hemispherical lens 5 scans while floating 20 nm to 100 nm above the surface of the optical disk 20. Here, since the interval between the hemispherical lens 5 and the optical disk 20 is less than ¼ of the initial wavelength of the light, near field effect causes light exiting the hemispherical lens 5 to continue propagating in the same direction in which it was propagating inside the hemispherical lens 5, and the light is thus projected into the optical coupling layer 1.

Here, the light beam exiting the hemispherical lens 5 has a beam spot at the flat surface of the hemispherical lens 5 which is not less than the wavelength in air of the light from the light source, i.e., at least 400 nm. Further, the optical coupling layer 1 is made of ultraviolet-curing resin having a refractive index of approximately 1.6, and also serves as a protective film for the recording layer 2. Incidentally, another light-transmitting body, such as glass, $SiO_2$, acrylic, polycarbonate, polyolefin resin, etc., may instead be used as the optical coupling layer 1.

The light beam entering the optical coupling layer 1 is converged onto the recording layer 2, being incident thereon with a beam spot having a diameter of 1/1.6 times that in Conventional Example 1 (as a light beam with an effective numerical aperture of 0.6×1.6=0.96). Therefore, the present invention enables high-density recording or reproducing from a high-density recording medium, with a good S/N ratio.

Next, the relationship between the optical coupling layer 1 and the hemispherical lens 5 will be explained with reference to FIG. 2.

Figure 2:
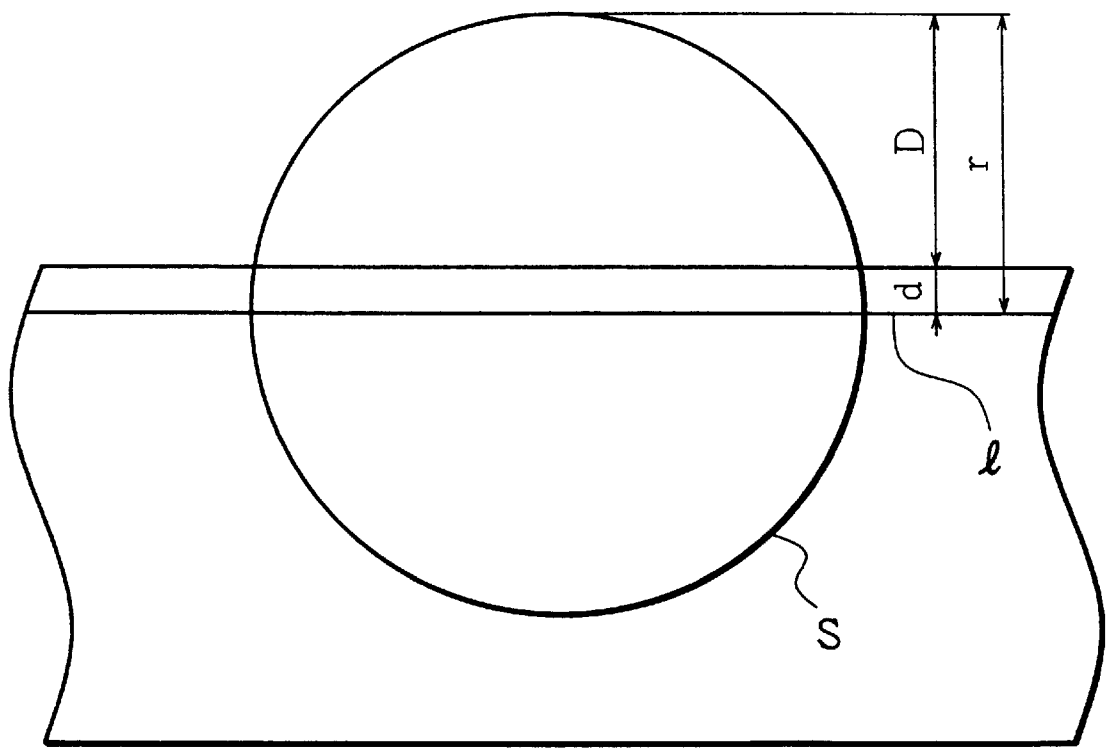
FIG. 2 is an explanatory drawing showing a relationship between thicknesses of a hemispherical lens and of an optical coupling layer, both shown in FIG. 1.

In FIG. 2, S is a sphere the hemispherical surface of the hemispherical lens 5 forms part of; r is a radius of the sphere S; l is a plane, parallel with the flat surface of the hemispherical lens 5, which passes through the center of the sphere S; D is a distance from an apex of the hemispherical surface to the flat surface of the hemispherical lens 5; and d is a thickness of the optical coupling layer 1 of the optical disk 20 (here, refractive indices of the hemispherical lens 5 and the optical coupling layer 1 are approximately equal).

As shown in FIG. 2, when the respective refractive indices of the hemispherical lens 5 and the optical coupling layer 1 are approximately equal, by providing the hemispherical lens 5 so that it is thinner than a true geometric hemisphere by approximately the thickness d of the optical coupling layer 1, the light converged by the objective lens 4 is correctly focused on the surface of the recording layer 2.

When the refractive indices of the hemispherical lens 5 and the optical coupling layer 1 differ from each other, it is necessary to optically compensate by changing the thickness of the hemispherical lens 5. Specifically, when the hemispherical lens 5 has a refractive index of N1 and a radius of r, and the optical coupling layer 1 has a refractive index of N2 and a thickness of d, it is satisfactory to set the distance D from the apex of the hemispherical surface to the flat surface of the hemispherical lens 5 to approximately r-d× N1/N2. In this way, the light beam can be accurately converged on the recording layer 2. When N1 and N2 are approximately equal, the recording layer 2 should coincide with a plane intersecting the center of the sphere S, and in this case the thickness required of the hemispherical lens 5 (the distance D) is the thickness (d) of the optical coupling layer 1 subtracted from the radius (r) of the sphere S.

If the thickness of the optical coupling layer 1 is not uniform, this is likely to obstruct recording and reproducing operations. Since non-uniform thickness is more marked the thicker the optical coupling layer 1, the optical coupling layer 1 should preferably be no more than 10 μm thick.

Conversely, if the optical coupling layer 1 is too thin, its function as protective film for the recording layer 2 is impaired, and, since the diameter of the light beam exiting the flat surface of the hemispherical lens 5 must be set smaller (to less than the wavelength λ of the light in air), the optical coupling ratio may be decreased. Accordingly, it is preferable to set the thickness of the optical coupling layer 1 to no less than the wavelength λ of the light in air, i.e., no less than 0.4 μm. Further, in consideration of ease of manufacture, a thickness of around 3 μm to 7 μm is preferable for the optical coupling layer 1.

Further, in the present embodiment, in order for the hemispherical lens 5 to scan across the optical disk 20, when using, as discussed above, a floating head which scans by floating above the optical disk 20, it is preferable to coat a lubricant, etc. onto either the surface of the optical coupling layer 1 or part of the slider of the floating head, thereby holding to a minimum the influence of friction between the floating head and the optical coupling layer 1.

Second Embodiment

Figure 3:
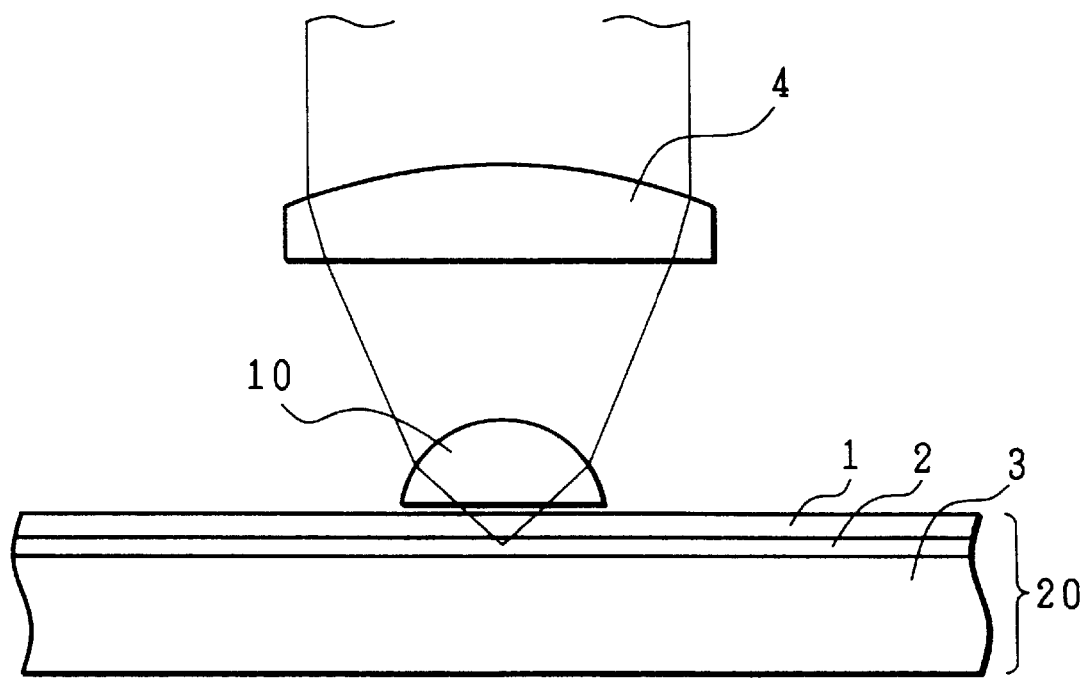
FIG. 3 is an explanatory drawing of an optical disk device according to a second embodiment of the present invention.

The present embodiment explains an optical disk device which increases numerical aperture using an objective lens 4 and a hemispherical lens 10, in order to realize recording density which is higher than in the first embodiment above. FIG. 3 is a drawing explaining this optical disk device. Members in FIG. 3 having the same functions as those shown in FIG. 1 will be given the same reference symbols, and explanation thereof will be omitted here.

In the first embodiment above, the rays of the light beam from the objective lens 4 struck the hemispherical lens 5 perpendicular to the surface thereof (the focal point of the light beam converged by the objective lens 4 coincided with the center of the hemispherical surface of the hemispherical lens 5), but in the present embodiment, the rays of the light beam strike the hemispherical lens 10 at an angle with respect to the surface thereof (with respect to the direction of propagation of the light beam, the center of the hemispherical surface of the hemispherical lens 10 precedes the focal point of the light beam converged by the objective lens 4). For this reason, the light rays are refracted at the surface of the hemispherical lens 10, and a very high numerical aperture (around 2.0, for example) can be obtained.

In the present second embodiment, as in the first embodiment above, the hemispherical lens 10 and the optical coupling layer 1 are provided in close proximity to one another. Accordingly, even with a high numerical aperture, the light from the hemispherical lens 10 can be efficiently projected into the optical coupling layer 1 without causing total reflection. Consequently, the optical disk device according to the present embodiment is able not only to further increase the density of recording and reproducing of information, but also to increase the certainty of recording and reproducing by holding light loss to a minimum.

Third Embodiment

The present third embodiment will explain an example of application of the optical disk device of the first embodiment above to a magneto-optical recording and reproducing device.

Figure 4:
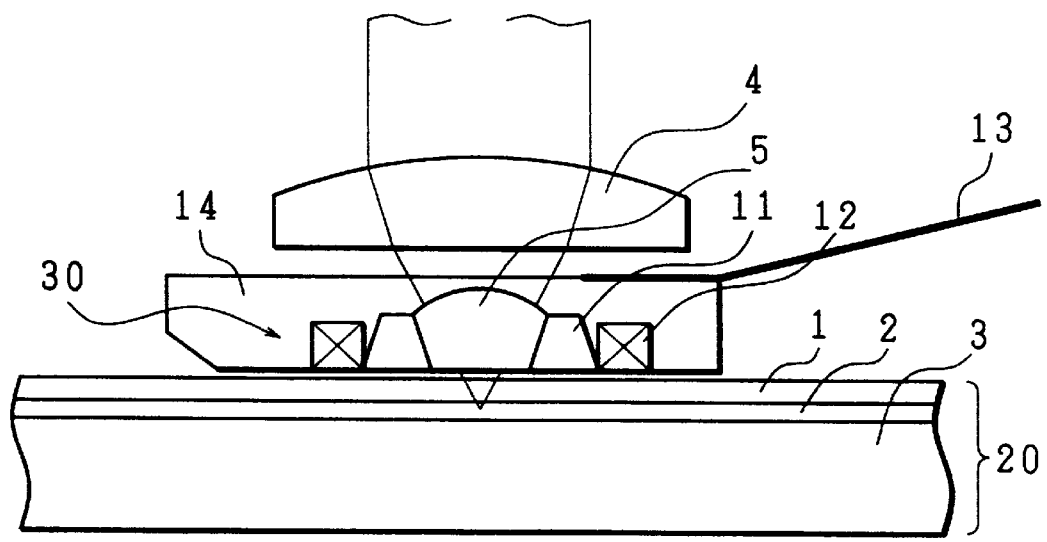
FIG. 4 is an explanatory drawing of an optical disk device according to a third embodiment of the present invention.
Figure 5:
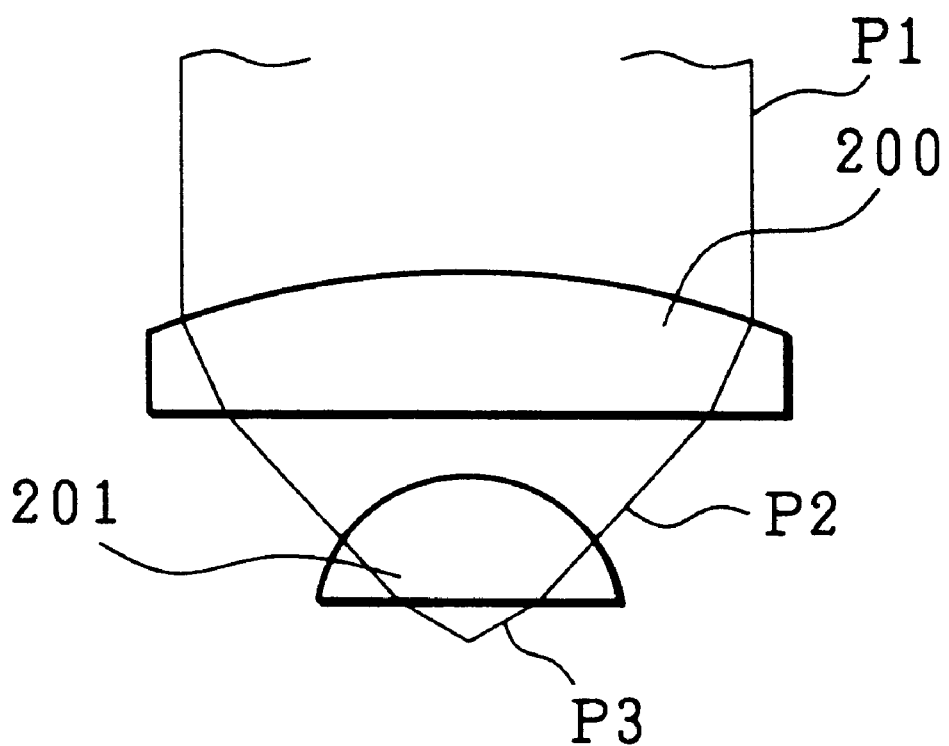
FIG. 5 is a drawing explaining a conventional objective lens composite.
Figure 6:
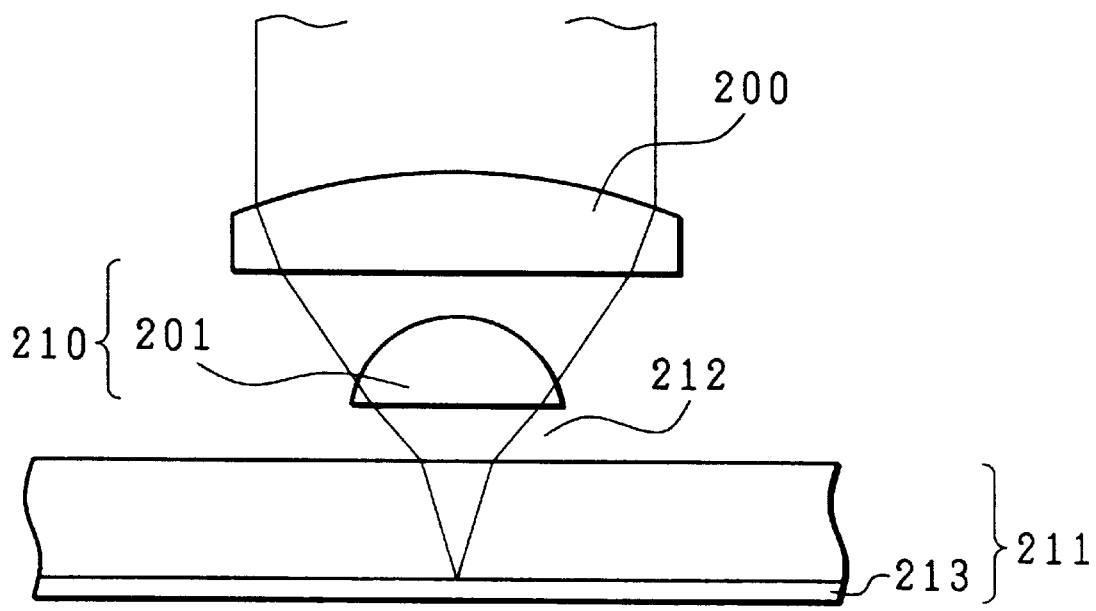
FIG. 6 is an explanatory drawing of an optical disk device according to Conventional Example 2 .
Figure 7:
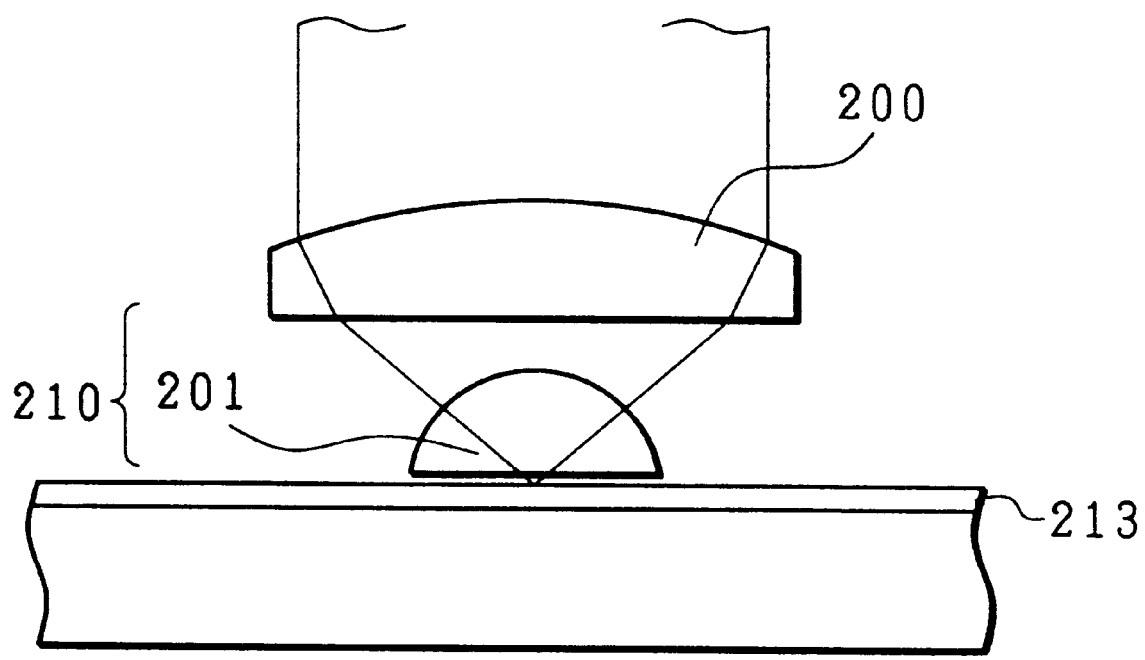
FIG. 7 is an explanatory drawing of an optical disk device according to Conventional Example 3.

FIG. 4 is a drawing explaining the structure of the magneto-optical recording and reproducing device according to the present embodiment. As shown in FIG. 4, in the magneto-optical recording and reproducing device according to the present embodiment, an objective lens 4 is provided so as to converge light incident thereon, and to guide the converged light to a hemispherical lens 5. The hemispherical lens 5 is provided so that the rays of the light beam from the objective lens 4 strike the hemispherical lens 5 perpendicular to the surface thereof, as in the first embodiment above. A light beam projected from the hemispherical lens 5, due to near field effect, maintains the direction of propagation in which it was propagating in the hemispherical lens 5, and is projected into an optical coupling layer 1 of an optical disk 20.

Consequently, as shown in the first embodiment above, the light beam from the hemispherical lens 5 is projected onto a recording layer 2 of the optical disk 20 as a beam spot of very small size. For this reason, it is possible to realize recording at high density, and reproducing of information with a high signal quality, without crosstalk. Recording and reproducing are performed by operations equivalent to those used in typical magneto-optical recording and reproducing devices.

In the magneto-optical recording and reproducing device in FIG. 4, in order to, as explained in the first embodiment above, set a small interval between the hemispherical lens 5 and the optical disk 20, a magnetic head 30 and the optical head (the hemispherical lens 5) are integrally provided within a slider 14 (floating head).

Specifically, as shown in FIG. 4, around the perimeter of the hemispherical lens 5 are provided a yoke 11 and a coil 12. The slider 14, supported by a slider suspension 13, is driven by a driving mechanism (not shown) so as to move above the optical disk 20, which is rotated, so that the hemispherical lens 5 (optical head) and the magnetic head 30 can be guided to a desired position of the optical disk 20. Thus recording or reproducing operations can be performed at a desired position (address) of the optical disk 20.

By means of such a structure, the magnetic head 30 can be positioned close to the optical disk 20, and high-speed data transfer can be realized. Further, power consumption and driving voltage can be reduced, and the quantity of heat produced can be held to a minimum.

In addition, since both a magnetic field and light can be applied from a single side of the optical disk 20, and recording of information on both sides of the optical disk 20 can be enabled by providing heads on both sides of the optical disk 20, and providing recording layers 2 on both sides of the substrate 3. Thus even higher recording density can be realized.

In accordance with recording and reproducing operations, the slider 14 scans above the optical disk 20, and, in order to float at a distance of not more than the wavelength $\lambda$ (in air) of the light projected onto the objective lens 4 (preferably $\lambda/4$, or more preferably $\lambda/8$), the lower surface of the slider 14 is designed with, for example, a groove.

In the present third embodiment, in order to provide the hemispherical lens 5 and the optical disk 20 very close to one another, the height of the lower surface of the slider 14 above the surface of the optical disk 20 is approximately equal to the height of the flat surface of the hemispherical lens 5 above the surface of the optical disk 20, and the distance between the flat surface of the hemispherical lens 5 and the optical coupling layer 1 (protective film) of the optical disk 20 is set as small as possible.

Incidentally, the objective lens 4 and the hemispherical lens 5 are here provided separately, but since the objective lens 4 and the hemispherical lens 5 must maintain a fixed positional relationship, it is preferable to provide these two members integrally.

The light beam projected into the optical coupling layer 1 is incident on the recording layer 2 in which information has been magneto-optically recorded (a magneto-optical recording layer, which may be made up of a plurality of layers), where the polarization of the light undergoes a change, and thus the recorded information is reproduced.

Here, if a transparent dielectric layer having a refractive index of n and a thickness of $\lambda/4n$ is provided between the optical coupling layer 1 and the recording layer 2, the Kerr rotation angle is increased, and reproducing signal quality can be increased. When the transparent dielectric layer is provided adjacent to the optical coupling layer 1, the refractive index of the transparent dielectric layer must differ from that of the optical coupling layer 1.

Further, it is preferable to provide a transparent dielectric layer and a reflective layer, in this order, on the other side of the recording layer 2 from the optical coupling layer 1, because in this case, due to a light interference effect, the Kerr rotation angle can be further increased.

Accordingly, an optical disk 20 suited for actual use is structured so that, on the substrate 3 are layered, in this order, a heat dissipation layer for dissipating heat; a reflective layer; a transparent dielectric layer; the recording layer 2; another transparent dielectric layer; and the optical coupling layer 1. The recording layer 2 is a thin film of rare earth-transition metals such as GdTbFe, TbFeCo, DyFeCo, TbDyFeCo, etc.

Further, for a recording medium which uses magnetic super-resolution, it is suitable to use an optical disk 20 structured so that, on the substrate 3 are layered, in this order, a heat dissipation layer; a protective film made of a dielectric material, etc.; a recording supplemental layer made of GdFeCo, etc.; one or more recording layers 2 made of GdTbFe, TbFeCo, DyFeco, TbDyFeCo, etc.; an intermediate layer made of AlN, SiN, a low-Curie-temperature material, etc.; a reproducing supplemental layer made of GdFe, etc.; a reproducing layer made of GdFeCo, etc.; a transparent dielectric layer; and the optical coupling layer 1.

Further, when using the magnetic domain expansion reproducing method, it is suitable to use an optical disk 20 structured so that, on the substrate 3 are layered, in this order, a heat dissipation layer; a protective film made of a dielectric material, etc.; a recording supplemental layer made of GdFeCo, etc. ; the recording layer 2 made of GdTbFe, TbFeCo, DyFeCo, TbDyFeCo, etc.; a magnetic masking layer made of AlN, SIN, a low-Curie-temperature material, etc. ; a reproducing supplemental layer made of GdFe, etc.; a reproducing layer of GdFeCo, etc.; a transparent dielectric layer; and the optical coupling layer 1.

Incidentally, the present embodiment explained an example of the optical disk device according to the present invention applied to a magneto-optical disk system, but the method of improving modulation strength by providing a transparent dielectric layer on one or both sides of the recording layer 2, as discussed above, can also be used in a recording medium for phase change recording.

As discussed above, with the optical disk device according to the present invention, by positioning the objective lens structure in close proximity to the optical recording medium, total reflection does not occur even with a large numerical aperture, and loss of light quantity can be held to a minimum. Accordingly, the spot diameter of the light beam projected onto the signal recording layer can be reduced, and recording and reproducing operations can be performed at high density. Further, since loss of light quantity is held to a minimum, low-power recording and reproducing can be realized, thus increasing the life of the light source (laser, etc.) and improving the reliability of recording and reproducing of information.

In addition, in the foregoing device and method, by providing the optical coupling layer 1 on top of the recording layer 2 of the optical disk 20, the optical coupling layer 1 also serves as a protective film, thus improving the resistance of the optical disk 20 to dust, and its reliability with regard to recording and reproducing of information.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention and the scope of the patent claims set forth below.

What is claimed is:

1. An optical recording and reproducing method, for performing at least one of recording information in and reproducing information from an optical recording medium by projecting a light beam from a light source onto a signal recording layer of said optical recording medium, wherein:

said optical recording medium is provided with an optical coupling layer on a light-incident side of said signal recording layer;

an objective lens structure having a light-converging function is provided in close proximity to said optical recording medium, in a position such that an interval between said objective lens structure and said optical recording medium is less than a wavelength of light produced by said light source; and the light beam is projected onto said signal recording layer of said optical recording medium by causing a light beam converged by the objective lens structure to couple with said optical coupling layer of said optical recording medium.

2. The optical recording and reproducing method set forth in claim 1, wherein:

the light beam projected by said objective lens structure has, at an end of the light beam incident on said optical coupling layer, a diameter which is less than the wavelength of the light produced by said light source.

3. The optical recording and reproducing method as set forth in claim 1, wherein a thickness of said optical coupling layer is set in a range of not less than 0.4 $\mu$m and not more than 10 $\mu$m.

4. The optical recording and reproducing method as set forth in claim 1, wherein a refractive index of said objective lens structure is set equal to or substantially equal to a refractive index of said optical coupling layer.

5. The optical recording and reproducing method as set forth in claim 1, wherein respective thicknesses of at least a portion of said objective lens structure and said optical coupling layer are set respectively so that said objective lens structure and said optical coupling layer together comprise an optical system having a converging function that directs a high-density light spot onto the signal recording layer.

6. An optical recording and reproducing method, for performing at least one of recording information in and reproducing information from an optical recording medium, provided with a signal recording layer and with an optical coupling layer on a light-incident side of said signal recording layer, by projecting a light beam from a light source onto said optical recording medium, wherein:

an objective lens structure is provided, which converges the light beam from said light source onto said optical recording medium; and the light beam is projected onto said signal recording layer of said optical recording medium by guiding a light beam from said objective lens structure into said optical coupling layer in such a manner as to substantially maintain a direction of propagation of the light beam when exiting a light-exit end of said objective lens structure.

7. An optical recording and reproducing device comprising a light source and an objective lens structure which converges a light beam from said light source onto an optical recording medium, for performing at least one of recording information in and reproducing information from said optical recording medium by projecting the light beam from said light source thereon, wherein:

said optical recording medium is provided with a signal recording layer, and with an optical coupling layer on a light-incident side of said signal recording layer; and said objective lens structure is provided in close proximity to said optical recording medium, in a position such that an interval between said objective lens structure and said optical recording medium is less than a wavelength of light produced by said light source, and a light beam converged by said objective lens structure is caused to couple with said optical coupling layer.

8. The optical recording and reproducing device set forth in claim 7, wherein:

said objective lens structure is provided such that a portion thereof in closest proximity to said optical coupling layer has a refractive index approximately equal to a refractive index of said optical coupling layer.

9. The optical recording and reproducing device set forth in claim 7, wherein:

said objective lens structure is provided such that the light beam projected thereby has a diameter larger than the wavelength of the light produced by said light source.

10. The optical recording and reproducing device set forth in claim 7, wherein:

said objective lens structure includes a hemispherical lens.

11. The optical recording and reproducing device set forth in claim 10, wherein:

said objective lens structure is a composite of lenses, including a first lens and a second lens provided along a light axis of the light beam from said light source; and said second lens is said hemispherical lens, provided so as to face said optical recording medium.

12. The optical recording and reproducing device set forth in claim 11, wherein:

a surface of said hemispherical lens, upon which a light beam from said first lens is incident, forms a hemisphere in accordance with an angle of converging of a light beam from said first lens, and another surface of said hemispherical lens, from which the light beam exits, is flat.

13. The optical recording and reproducing device set forth in claim 12, wherein:

said hemispherical lens is provided such that said flat surface thereof is parallel with a surface of said signal recording layer.

14. The optical recording and reproducing device as set forth in claim 13, wherein:

a distance D from an apex of the hemispherical surface to the flat surface of said hemispherical lens is set so as to satisfy the relationship:

$$D=(r-d\times N1/N2)$$

where N1 and r represent a refractive index and a radius of said hemispherical lens, respectively, and N2 and d represent a refractive index and a thickness of said optical coupling layer, respectively.

15. The optical recording and reproducing device as set forth in claim 13, wherein a refractive index of said hemispherical lens is set equal to or substantially equal to a refractive index of said optical coupling layer.

16. The optical recording and reproducing device set forth in claim 10, wherein:

a thickness of said hemispherical lens is set in consideration of a thickness of said optical coupling layer.

17. The optical recording and reproducing device as set forth in claim 7, wherein said optical coupling layer has a thickness of not less than 0.4 μm and not more than 10 μm.

18. The optical recording and reproducing device as set forth in claim 7, wherein said optical coupling layer has a thickness of not less than 3 μm and not more than 7 μm.

19. The optical recording and reproducing device as set forth in claim 7, wherein a refractive index of said objective lens structure is set equal to or substantially equal to a refractive index of said optical coupling layer.

20. The optical recording and reproducing device as set forth in claim 7, wherein a thickness of at least a portion of said objective lens structure is set relative to the thickness of the optical coupling layer so that said objective lens structure and said optical coupling layer together comprise an optical system having a converging function that directs a high-density light spot onto the signal recording layer.

21. An optical recording medium which undergoes at least one of recording and reproducing of information when an objective lens structure, which converges a light beam from a light source, is positioned such that an interval between said optical recording medium and said objective lens structure is less than a wavelength of light produced by said light source, said optical recording medium including:

a signal recording layer, on which information is recorded, and an optical coupling layer provided on a side of said signal recording layer facing said objective lens structure, with which light projected from said objective lens couples, wherein said optical coupling layer has a thickness of not less than 0.4 μm and not more than 10 μm.

22. The optical recording medium set forth in claim 21, wherein:

said optical coupling layer also serves as a protective film for said signal recording layer.

23. The optical recording medium set forth in claim 21, wherein:

said optical coupling layer has a refractive index which is set in accordance with a refractive index of a light-exit portion of said objective lens structure.

24. The optical recording medium set forth in claim 21, wherein:

said optical coupling layer transmits light projected by said objective lens structure to said signal recording layer in such a manner as to substantially maintain a direction of propagation of the light.

25. The optical recording medium as set forth in claim 21, wherein a thickness of said optical coupling layer is set relative to a thickness or at least a portion of the objective lens structure so that said objective lens structure and said optical coupling layer together comprise an optical system having a converging function that directs a high-density light spot onto the signal recording layer.

* * * * *

UNITED STATES PATENT AND TRADEMARK OFFICE
CERTIFICATE OF CORRECTION

PATENT NO. : 6,298,018 B1
DATED : October 2, 2001
INVENTOR(S) : A. Takahashi et al.

It is certified that error appears in the above-identified patent and that said Letters Patent is hereby corrected as shown below:

Title page,
Item [56], References Cited, under U.S. PATENT DOCUMENTS, add the following additional citation:

-- 5,121,256    6/1992  Corle et al..........................359/664 --

Following "6,069,853  *   5/2000  Novotny et al. .........369/13", add the following additional citations:

-- FOREIGN PATENT DOCUMENTS

8/212,579    8/96    (JP)
8/221,772    8/96    (JP)
8/221,790    8/96    (JP)

PUBLICATIONS

"*Revitalizing the HHD by Improving Recording Density: Innovations in Optical System and Recording Layer*", Nikkei Electronics, June 16, 1997, pp. 99-108. --

Signed and Sealed this

Thirtieth Day of July, 2002

Attest:

JAMES E. ROGAN
*Attesting Officer*   *Director of the United States Patent and Trademark Office*